Oct. 11, 1966    M. L. CRIPE    3,277,650
BRAKE PROPORTIONING MEANS
Filed Sept. 3, 1963    2 Sheets-Sheet 1
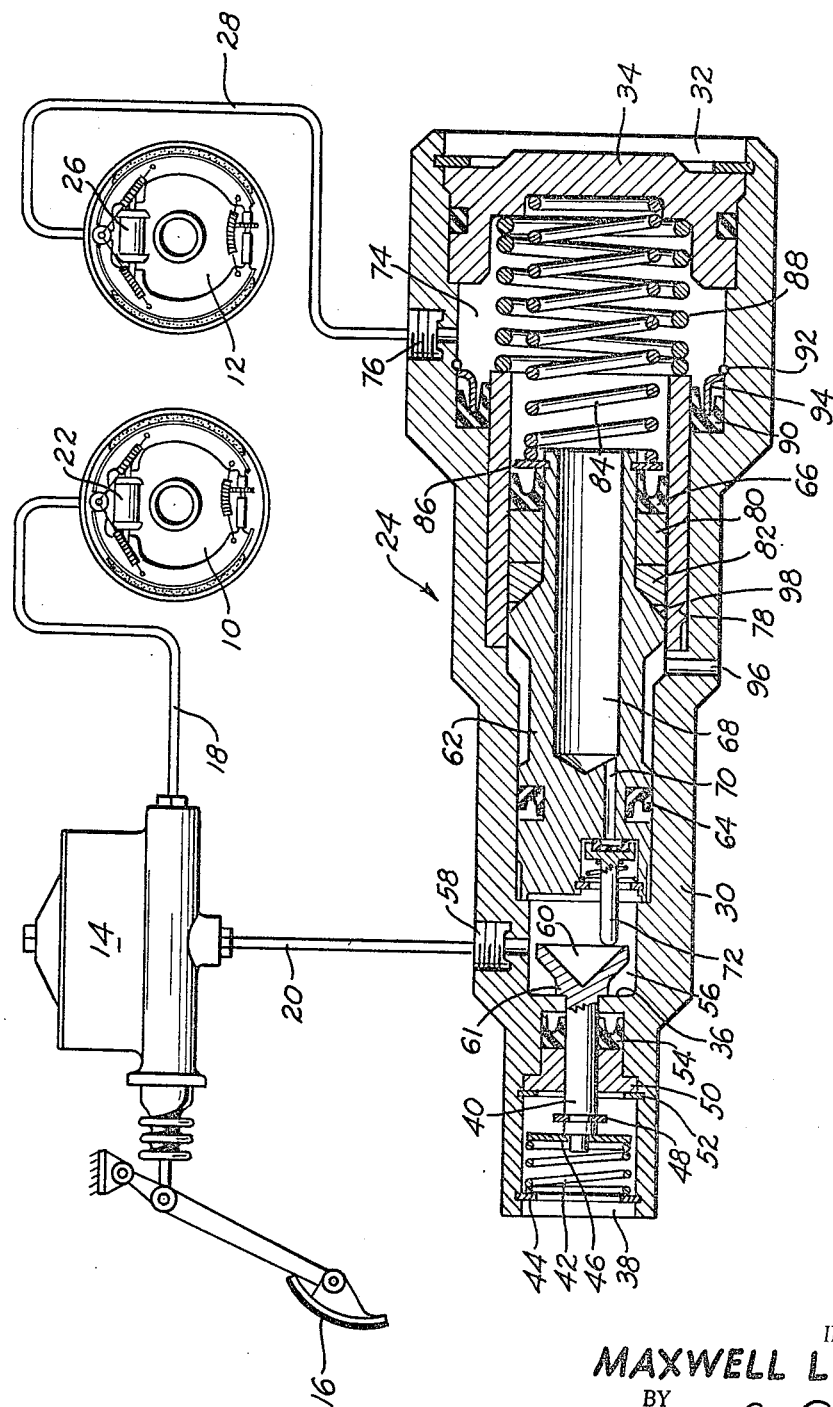
INVENTOR.
MAXWELL L. CRIPE.
BY
Richard G. Geib
ATTORNEY.

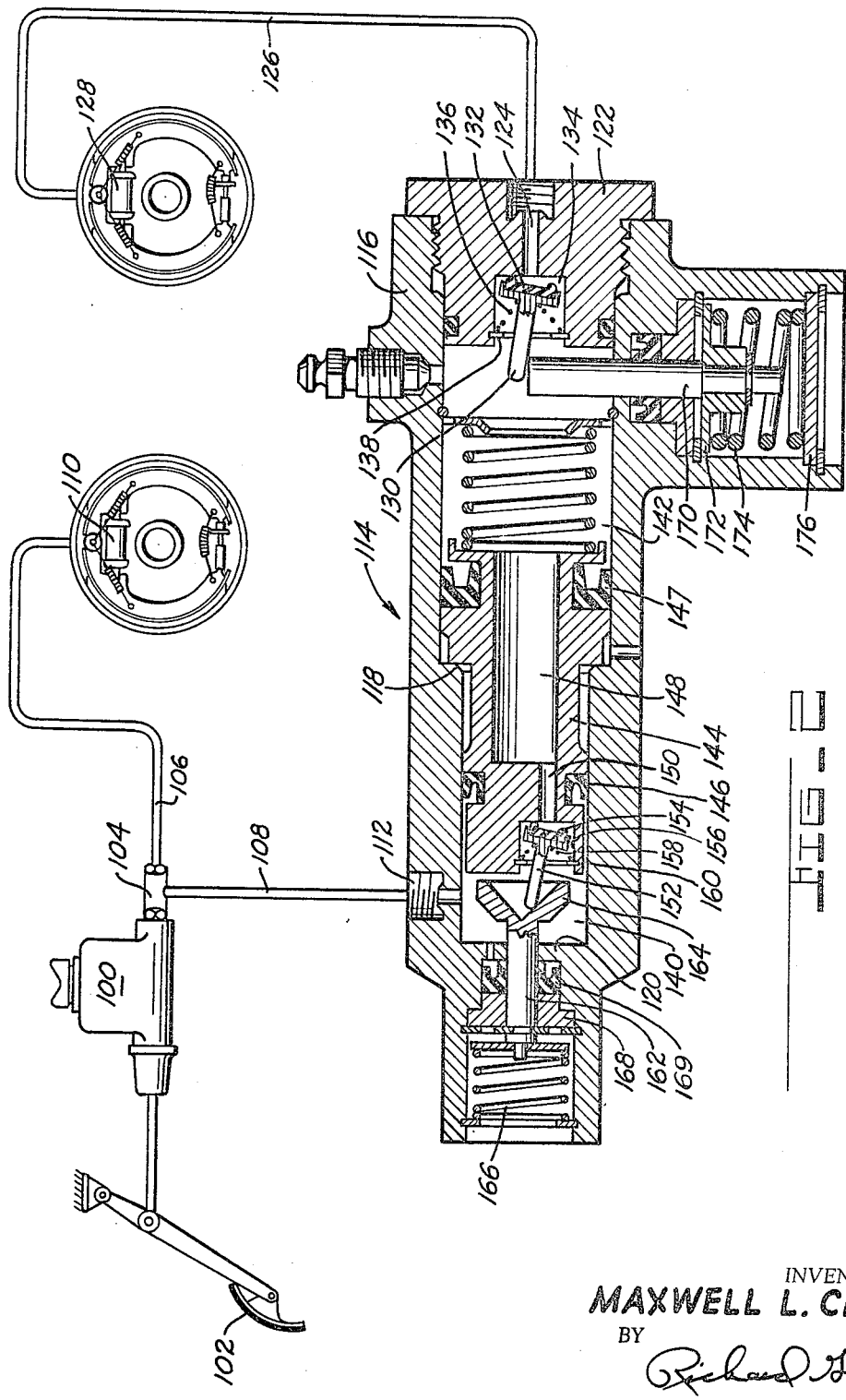

United States Patent Office 3,277,650
Patented Oct. 11, 1966

3,277,650
BRAKE PROPORTIONING MEANS
Maxwell L. Cripe, South Bend, Ind., assignor to The Bendix Corporation, South Bend, Ind., a corporation of Delaware
Filed Sept. 3, 1963, Ser. No. 306,221
13 Claims. (Cl. 60—54.5)

This invention relates to a valve device for proportioning the rear braking pressure of a vehicle having front and rear brakes.

It is a principal object of my invention to provide a pressure responsive deceleration sensing means which will automatically proportion the braking pressure of a rear braking system for a vehicle in accordance with a predetermined load shift of the vehicle brought about by braking thereof.

It is also an object of my invention to connect a frictionally restrained pressure responsive device to a standard master cylinder between the master cylinder and a rear wheel braking system for a vehicle while allowing free flow to the front wheel braking system of the vehicle.

It is a further object of my invention to provide a proportioning device for the rear wheel brakes of a vehicle that will allow fluid compensation within the rear braking system.

Still another object of my invention is to provide a brake proportioning mechanism with a fail-safe type master cylinder to regulate the pressure of one of the flows delivered thereby.

As will be realized by those skilled in the art to which my invention relates, other and further objects and advantages of my invention will appear from the following description of the drawings showing a cross sectional view of a brake proportioning means embodied in a schematic vehicle braking system in accordance with the principles of my invention.

In more detail, the drawings are described as follows:
FIGURE 1 shows a frictionally restrained pressure responsive proportioning mechanism in cross section as applied to a fail-safe braking system for a vehicle; and FIGURE 2 shows a ratio changing type brake proportioning mechanism as applied to a vehicle braking system shown in schematic.

With more detail, I show in FIGURE 1 a braking system for a vehicle having front wheel brakes 10 and rear wheel brakes 12. As seen, the braking system also employs a fail-safe or "split" type master cylinder 14 operated by a brake pedal 16 to deliver equal pressure flows to conduits 18 and 20. Conduit 18 is connected to a wheel cylinder 22 operating the front wheel brakes 10; whereas, conduit 20 is connected to a proportioning device 24 that is, in turn, connected to a wheel cylinder 26 of the rear wheel brakes 12, as by a conduit 28.

The brake proportioning 24 includes a housing 30 having a stepped bore 32, which is closed by an end cap 34 at one end and by a partition 36 at the small diameter end opposite the end cap 34. The housing 30 also includes a bore 38 opposite the partition 36 within which a valve plunger 40 is resiliently mounted as by a spring 42 that is arranged between a spring retainer 44 and a plate 46 connected to the plunger 40. In addition, the plunger 40 is provided with a flange 48 to limit the movement of the plunger through a guide 50 held within the bore 38 by a snap ring 52. Between the guide 50 and the partition 36 I have provided a seal 54 that cooperates with the plunger 40 to seal a chamber 56 receiving fluid from the conduit 20 through an inlet 58 in the housing 30. The plunger 40 terminates in a V cup 60 that is within the chamber 56 ahead of the partition 36, which cup is provided with a shoulder portion 61 that cooperates with the partition 36 and limiting rearward movement of the plunger 40.

The other end of chamber 56, opposite that of partition 36, is closed by a piston 62 provided with appropriate seals 64 and 66 adjacent either end of the piston 62, which piston is under control of the pressure of the fluid within the chamber 56 as applied thereto by the master cylinder 14. The piston 62 is axially bored, as at 68, and provided with an axial passage 70 adjacent the end thereof in cooperation with chamber 56. The axial passage 70 is closed by a valve 72 adapted to cooperate with the V cup 60. Thus, whenever the valve control rides up the sides of the V cup the passage 70 is open to communicate the bore 68 with the chamber 56.

At the forward end of the piston 62 the bore opens into a chamber 74 that is closed by the end cap 34 and provided with an outlet 76 which communicates with the conduit 28.

About the forward end of piston 62 I have arranged a sleeve 78, which sleeve is spaced from piston 62 by a bearing block 80 and a split clamping ring 82 both of which are immediately behind the seal 66. In order to position the piston 62 and the sleeve 78 I have provided an inner spring 84 between end cap 34 and a spring bearing plate 86 on the inner piston 62, and an outer spring 88 between the end wall 34 and the forward face of sleeve 78. As seen, a wiping type seal 90 that is retained by a snap ring 92 bearing on a lip spreading means 94 is adapted to seal the space between the sleeve 78 and the housing 30.

In addition, in order to prevent a pressure lock, I propose a bleed orifice 96 in the wall of the housing 30 between the seals 64 and 66 of the piston 62.

In operation, as an operator of a vehicle presses on the brake pedal 16 displacing an equal amount of fluid from the master cylinder 14 into conduits 18 and 20 to actuate the front wheel cylinders 22, a fluid flow is first created through chamber 56, passage 70, bore 68, chamber 74 and out opening 76 into conduit 28 to actuate the rear wheel cylinder 26. As the brakes 12 engage the drums (not shown), the pressure will build up in chamber 56 to move the plunger 40 to close the valve 72 and start movement of piston 62. Further pressurized flow from conduit 20 into chamber 56 via inlet 58 will move the piston 62 against the spring 84 to pressurize fluid in chamber 74. Upon reaching a predetermined pressure level, the pressure on the seal 66 causes the split clamping ring 82 to ride up upon the beveled surfaces 98 machined on the outer walls of piston 62 to wedge the piston 62 and the sleeve 78 together. This will provide the piston 62 with a frontal area in the chamber 74 that is, as seen, considerably in excess of the piston frontal area in chamber 56. Therefore, a considerable increase in the pressure in the fluid in chamber 56 would be required to increase the pressure in chamber 74 and likewise cause further actuation of the wheel cylinder 26 of the rear brake.

As for the system shown in FIGURE 2, I propose to utilize a master cylinder 100 that is actuated by a brake pedal 102 to deliver a pressurized fluid via conduit 104 to conduits 106 and 108. The conduit 106 is connected to a wheel cylinder 110 of a front wheel brake for a vehicle (not shown); whereas, the conduit 108 is connected to the inlet 112 of a brake proportioning mechanism 114. The brake proportioning mechanism 114 includes a housing 116 that is step-bored, as at 118, to provide an internal chamber, which chamber is closed at one end by a partition 120 and at the other end by an end plug 122 that is threaded to the housing 116. The end plug is axially drilled to provide an outlet passage 124 in communication with a conduit 126 that conducts flow to a wheel cylinder 128 adapted to operate the rear wheel brakes of the associated vehicle. Furthermore, the end plug 122 is provided with a valve mechanism 130 containing a poppet 132 and pivotally held within a chamber 134 of the end plug 122 by a conical spring 136 that is biased against a retaining plate 138.

The internal chamber of the housing 116 is divided into variable volume chambers 140 and 142 by a piston 144. As seen, appropriately designed seals 146 and 147 are provided on the piston 144 to seal the chambers 140 and 142 from each other. The piston 144 is also axially drilled, as at 148 that terminates in an axially offset passage 150 that is controlled by a valve mechanism 152 having a valve poppet 154 mounted within a counterbore 156 in the rear face of the piston 144 by a conical spring 158 that is biased against a retainer plate 160.

I have also slidably mounted through the partition 120 a valve control means 162 having a cup 164 adapted to cooperate with a projection of the valve mechanism 152 to open the passage 150 and bore 148 to allow communication of chambers 140 and 142. The valve control plunger 162 is biased by a spring 166 inwardly of the chamber 140 and is bearingly supported by a member 168 having a seal 169 to prevent leakage of the chamber 140.

At the opposite or forward end of the housing 116 I provide a radial opening through which a control rod 170 is slidably inserted into chamber 142 to contact a projection of the valve mechanism 130 to allow communication of chamber 142 with the conduit 126. The control 170 is affixed to a spring bearing plate 172 that is biased by a spring 174 compressed between a plate 176 and the spring bearing plate 172 to pivot the valve mechanism 130, as aforementioned, until the pressure in chamber 142 is sufficient to overcome the effect of spring 174 to cause plunger control rod 170 to move outwardly of the chamber 142; whereupon the valve mechanism 130 is allowed to close over the outlet 124.

In operation, as an operator depresses the brake pedal 102 causing the master cylinder 100 to develop pressure to the front wheel cylinder 110 and in the conduit 108, the chamber 140 of the brake proportioning mechanism 114 is pressurized to first cause the cup 164 to move outwardly compressing the spring 166 to close the valve mechanism 152 and upon further pressure cause the piston 144 to traverse the internal chamber of the housing 116. This will pressurize the chamber 142 and, in that the piston face within the chamber 142 is of greater area than that in chamber 140, the build up in chamber 140 will be greater than that in chamber 142 in order to cause piston movement. When the pressure in chamber 142 reaches a predetermined value the control rod 170 is caused to compress the spring 174 to close the valve mechanism 130 which had up to this time allowed direct flow to the rear wheel cylinder 128. Therefore, regardless of increasing brake pressure to the front wheel brakes the rear wheel brake system will not be further pressurized.

It will be understood that this invention is susceptible to modification in order to adapt it to different usages and conditions, and, accordingly it is desired to comprehend such modifications within this invention as may fall within the scope of the appended claims.

What is claimed as this invention is:

1. In a brake system a means to proportionally vary brake forces to one set of brakes in accordance with a force applied to the other set of brakes, which means comprises:
   a housing having a chamber therein with an outlet and an inlet connection therewith;
   a first pressure responsive means in said chamber with passage means therethrough to communicate said inlet and outlet connections;
   a valve means controlling said passage means, which valve means includes a second pressure responsive member in said chamber adjacent said inlet connection therewith spaced from said first pressure responsive means, a valve operatively connected to said first pressure responsive means by a spring, said valve having a stem for engagement with said second pressure responsive member such that, when a predetermined pressure is reached and said second pressure responsive member is moved away from said stem, said valve closes said passage means through said first pressure responsive means so that said first pressure responsive member is controlled by inlet pressure; and
   a means to decrease outlet pressure as a function of inlet pressure.

2. A means to proportionally vary brake forces in accordance with claim 1 wherein said means to decrease outlet pressure as a function of inlet pressure may be characterized as a sleeve slidably arranged coextensively with said pressure responsive means and adapted to be releasably connected to said pressure responsive means upon the achievement of a predetermined pressure in said outlet connection to increase the area of said pressure responsive means adjacent said outlet connection as respects the area thereof adjacent said inlet connection whereupon a greater inlet pressure is required to create a further increase in outlet pressure.

3. A means to proportionally vary brake forces in accordance with claim 1 wherein said means to decrease outlet pressure as a function of inlet pressure may be characterized as a pressure control valve means including a resiliently biased control rod adapted to operate a valve poppet to close said outlet connection upon the creation of a predetermined pressure adjacent said outlet connection.

4. A vehicle brake system comprising:
   a front wheel brake including a front wheel cylinder;
   a rear wheel brake including a rear wheel cylinder;
   a master cylinder adapted to be controlled by an operator of a vehicle;
   a first conduit delivering fluid from said master cylinder to said front wheel brake wheel cylinder;
   a second conduit for delivering fluid from said master cylinder;
   a brake proportioning mechanism having a pressure responsive means therein between two variable volume chambers of different diameter, an inlet for the smaller diameter chamber, an outlet for the larger diameter chamber, a passage through said pressure responsive means and valve means subjected to inlet pressure to control said passage, said inlet being connected to said second conduit;
   a pressure responsive control in said larger diameter chamber adapted to be operated by the pressure in said larger diameter chamber to limit the pressure in said outlet to a level below that at said inlet; and
   a third conduit connected to said outlet and said rear wheel cylinder to provide a brake pressure to said rear wheel brake that is proportioned in accordance with front wheel brake pressure.

5. A vehicle brake system according to claim 4 and further characterized in that said brake proportioning mechanism includes a housing with a stepped bore therein within which a pressure responsive means is slidably mounted to have a small effective area at one end thereof with a large effective area at the other end thereof.

6. A vehicle brake system in accordance with claim 4 wherein said valve means within said brake proportioning mechanism is characterized as being a spring loaded plunger having a cup at one end thereof within the small diameter chamber which is arranged to be operatively connected with a rod that is connected to a poppet member so that upon engagement of the rod and the cup the poppet member is unseated to permit flow through said pressure responsive means.

7. A vehicle brake system in accordance with claim 4 wherein said pressure responsive control is further characterized as being a spring biased sleeve that is surrounding said pressure responsive means in said large diameter chamber, said sleeve being adapted to be connected with said pressure responsive means upon the creation of a predetermined pressure within the larger diameter chamber to create a large frontal area in said large diameter chamber which will at lower pressures resist the inlet pressure tending to act on the small frontal area of the pressure responsive means and the small diameter chamber.

8. A vehicle brake system according to claim 4 wherein said pressure responsive control is further characterized as being a spring biased plunger operatively connected with a valve poppet extension that is adapted to close said outlet upon the retraction of said spring biased plunger from the large diameter chamber.

9. In a braking system a means to proportionally vary brake forces to one set of brakes in accordance with a pressure in the braking system, which means comprises:

a housing having a stepped chamber therein with an inlet leading to a smaller portion of the chamber and an outlet leading from the larger portion thereof;

a movable wall in said chamber slidably mounted in the smaller portion and projecting into the larger portion, said wall having a control flow passage therethrough for communicating the inlet and outlet;

a movable sleeve slidably arranged in the larger portion of said chamber about said movable wall projecting therein;

a friction locking means to unite said sleeve and said wall operatively connected to said wall; and means for operating said locking means as said wall moves within said sleeve that will join said wall and sleeve when pressure at said inlet exceeds a predetermined value to increase the effective area of said wall in the larger portion of said chamber.

10. A means to proportionally vary brake forces in accordance with claim 9 and further comprising a means controlling said passage through said wall.

11. A means to proportionally vary brake forces in accordance with claim 10 wherein said means controlling said passage includes a pressure responsive valve operating plunger and a valve operatively connected to said wall and said plunger.

12. A means to proportionally vary brake forces in accordance with claim 9 wherein said wall projecting into the larger portion of said chamber is provided with cam surfaces abutting said friction locking means and said means for operating the latter includes a pressure responsive means for forcing said locking means outwardly to frictionally clamp said sleeve and said wall together.

13. In a brake system, a means to proportionally vary brake forces according to claim 1 wherein said second pressure responsive member is characterized as having a V cup for engagement with said stem of said valve whenever the inlet pressure is below the predetermined pressure to tilt said valve and thereby maintain said passage in said first pressure responsive means open so that said inlet is communicated through said first pressure responsive means to said outlet connection.

References Cited by the Examiner
UNITED STATES PATENTS

| | | | |
|---|---|---|---|
| 2,340,462 | 2/1944 | Gallup et al. | 60—54.5 |
| 2,375,750 | 5/1945 | Campbell | 60—54.6 |
| 2,479,232 | 8/1949 | Gunderson | 60—54.6 |
| 2,991,797 | 7/1961 | Baldwin | 60—54.5 X |
| 3,087,761 | 4/1963 | Stelzer | 303—24 |
| 3,143,125 | 8/1964 | Stelzer | 303—6 X |
| 3,147,046 | 9/1964 | Stelzer | 303—24 |

MARTIN P. SCHWADRON, *Primary Examiner.*

ROBERT R. BUNEVICH, *Examiner.*